United States Patent [19]

Laskody

[11] Patent Number: 4,788,855
[45] Date of Patent: Dec. 6, 1988

[54] TEST APPARATUS FOR MEASURING JET ENGINE THRUST

[75] Inventor: Jerome R. Laskody, Carnation, Wash.

[73] Assignee: The Boeing Company, Seattle, Wash.

[21] Appl. No.: 21,225

[22] Filed: Mar. 3, 1987

[51] Int. Cl.$^4$ ........................................... G01M 15/00
[52] U.S. Cl. ................................................. 73/117.4
[58] Field of Search .................. 73/117.1, 117.4, 865.6

[56] References Cited

U.S. PATENT DOCUMENTS 3,210,991 10/1965 Weekley ............................. 73/117.4
4,176,547 12/1979 McClure et al. .................. 73/862.09

Primary Examiner—Jerry W. Myracle
Attorney, Agent, or Firm—Hughes, Cassidy & Multer

[57] ABSTRACT

Apparatus for simultaneously measuring the torque generated by a bladed turbofan engine as well as the forward force generated by gases exhausted from the turbofan engine in order to calculate total thrust. The apparatus includes a cradle for suspending the engine. A load cell connected between the cradle and a rigid structure measures the force generated by gases exhausted from the engine. The rotational torque generated by rotating bladed fan sections of the engine are measured by individual dynamometers. The dynamometers are connected to the fan sections by endless belts which are engaged to geared cowlings mounted to the fan sections in place of the blades and fan section cowlings. Each endless belt is also engaged to a rotatable gear member of the dynamometer so as to transmit the generated torque between the fan section and the dynamometer.

7 Claims, 3 Drawing Sheets

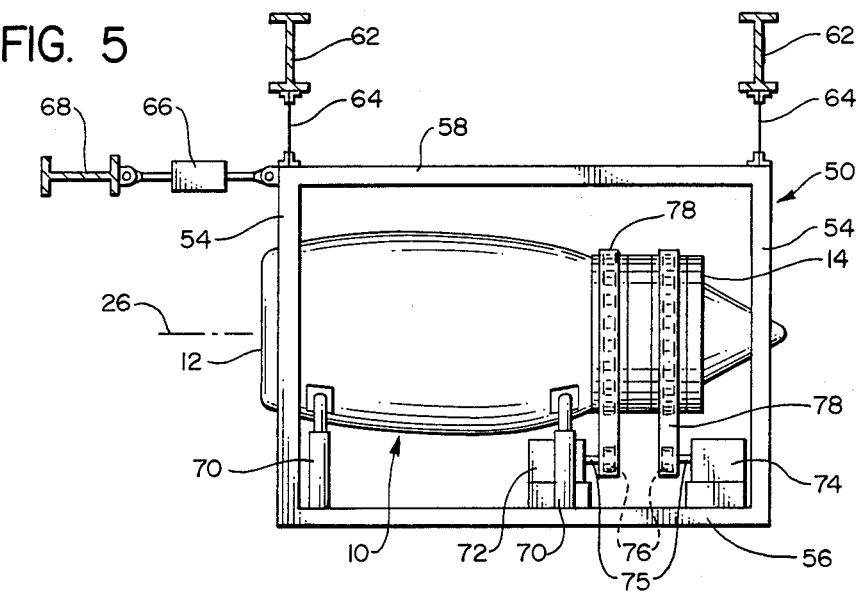
FIG. 5
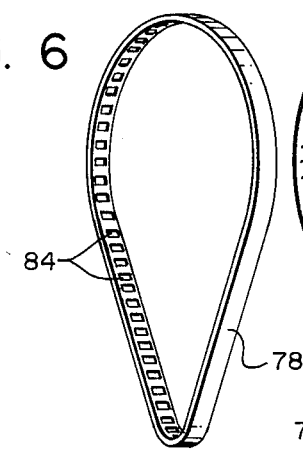
FIG. 6
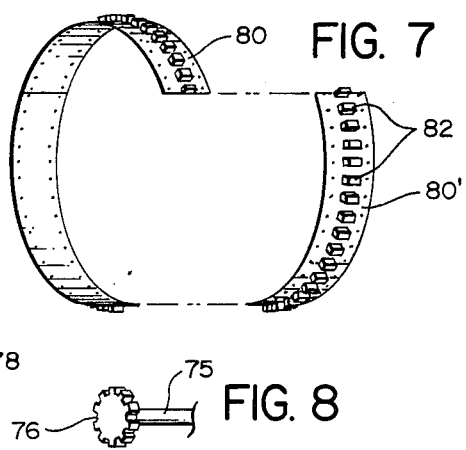
FIG. 7
FIG. 8
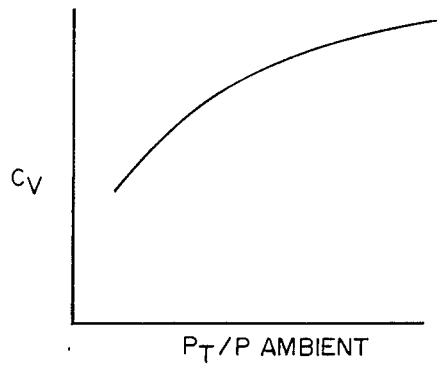
FIG. 9

TEST APPARATUS FOR MEASURING JET ENGINE THRUST

TECHNICAL FIELD

The present invention relates to apparatus for measuring the torque generated by a bladed turbofan engine, as well as the forward force generated by gases exhausted from the turbofan engine in order to determine total thrust output by the engine.

BACKGROUND OF THE INVENTION

In aircraft engine manufacturing it is often a requirement to determine the total thrust generated by an engine at various airspeeds. In a conventional turboprop engine, the thrust was sometimes determined by measuring the torque generated at the propeller shaft utilizing a dynamometer or the like, and then solving for thrust.

In the next generation of commercial airline aircraft, consideration is being given to powering these aircraft by means of an unducted bladed turbofan engine. This engine includes a forward compressor section, an intermediate burner section, a high pressure turbine section, a rear propeller/power turbine section and an exhaust section. The propeller or fan section is made up of a number of counterrotating blades which propel the aircraft and which are mounted on internal power turbines which are driven by the exhaust gases from the high pressure turbine section. After driving the turbines, the exhaust gases are discharged from the exhaust section of the engine to produce additional thrust.

Unlike conventional turboprop engines, in the unducted turbofan engine there is no propeller shaft upon which to conveniently attach a dynamometer to accurately measure the torque generated, and in turn to calculate thrust.

A number of conventional apparatus for measuring torque have been disclosed. For example, in U.S. Pat. No. 4,176,547 by McClure et al, there is disclosed a ring assembly which is used as part of a test stand for measuring the performance of a turboshaft engine wherein one of the rings is rigidly attached to the test stand and the other ring is rigidly attached to the outer casing of the engine. When the engine is operating, reaction torque between the rings is measured by a number of strain gauge beams which interconnect the two rings.

Other torque measuring apparatus include U.S. Pat. No. 3,190,113 Lucia, which pertains to a measuring device which is attached to a prime mover and which has a flywheel which is accelerated from a first known angular velocity to a second known angular velocity over measured time, the torque being a function of the measured time and the moment of inertia of the flywheel.

In Richmond, U.S. Pat. No. 3,190,113, there is disclosed torque measuring apparatus which measures the magnitude and frequency of radial deflection of a selected point on an outer ring gear of a gearbox due to torque generated by the various gears in the gearbox which are operatively connected to the outer ring gear.

Furthermore, in U.S. Pat. No. 2,129,241 by Sarazin there is a torque measuring device which is mounted to a shaft and which measures shaft torque as a function of the shaft velocity and the angle of centrifugal displacement of a pair of pivotally mounted arms.

Eckart, in U.S. Pat. No. 3,788,130 discloses a torque measuring device that measures the reaction force on one of a pair of intermeshing helical gears of an engine gearbox so as to determine the engine torque output.

Other devices for measuring engine parameters are disclosed in U.S. Pat. No. 4,417,469 by Stevenson et al which includes apparatus for determining the speed of an engine and for determining the phase shift between a timing shaft and a fuel cam shaft of the engine, by generating signals as a function of the respective shaft angular velocities.

Apparatus for measuring thrust from a rocket engine is disclosed in U.S. Pat. No. 3,788,130 by Ormond wherein the rocket engine is supported in a nose down vertical manner on a base plate which rests on a number of load cells for measuring the thrust force when the engine is operating.

Another torque measuring device is disclosed by Stratton in U.S. Pat. No. 3,403,546, in which variations in the concrete mix contents of a rotating mixer are determined by measuring the variations in load torque delivered by an engine to the mixer via a drive chain.

Another patent pertaining to cement mixers is U.S. Pat. No. 1,980,184 by Butcher where there is disclosed a system for recording the power output to rotate a drum of a cement mixer wherein the recording apparatus is geared to the rotating drum by means of an outer perimeter gear on the drum.

Finally, in U.S. Pat. No. 4,083,235 by Gallant there is disclosed a compressor stall warning system for a gas turbine engine in which turbine inlet temperature and compressor rotor speed are measured and their ratios calculated to generate a signal when the ratio exceeds a predetermined limit.

SUMMARY OF THE INVENTION

It is an object of the present invention to provide apparatus and methods for measuring the torque and forward force generated from a bladed turbofan jet engine. The turbofan engine is characterized by (1) gas generating section for generating drive gases, (2) a fan section which rotates in response to the drive gases and which includes exterior blades which rotate with the fan section for generating a propelling force. Furthermore, the jet engine includes an outlet section for exhausting the drive gases to the atmosphere to provide a further propelling force. The apparatus includes a cradle for supporting the engine, and means for suspending the cradle in mid air from a support structure so as to permit movement of the cradle in a lengthwise direction. Also included are means for measuring a forward thrust generated by the drive gases which are exhausted to the atmosphere. The measuring means includes a load cell which is connected between a support structure and the cradle, for measuring a lengthwise force generated by the drive gases. Also included are dynamometer means for measuring torque generated by the engine rotating fan section. Drive gear means connect the dynamometer means to the engine fan section. The drive gear means includes belt means which are removably connected to the fan section and to a rotatable portion of the dynamometer means so as to transmit a rotational force between the fan section and the dynamometer means.

BRIEF DESCRIPTION OF THE DRAWINGS

These and other objects and advantages of the present invention will become more readily apparent upon reading the following Detailed Description and attached Drawings in which:

FIG. 5 is a side view of the test apparatus of the present invention;

FIG. 6 is an isometric view of a drive belt for connecting a rotating fan section to a dynamometer;

FIG. 7 is an isometric view of a replacement cowling section having circumferential gear teeth;

FIG. 8 is a partial isometric view of a geared portion of the dynamometer; and

FIG. 9 is a graph of nozzle velocity coefficient ($C_v$) as a function of the ratio of nozzle total pressure to ambient pressure.

Figure 1:
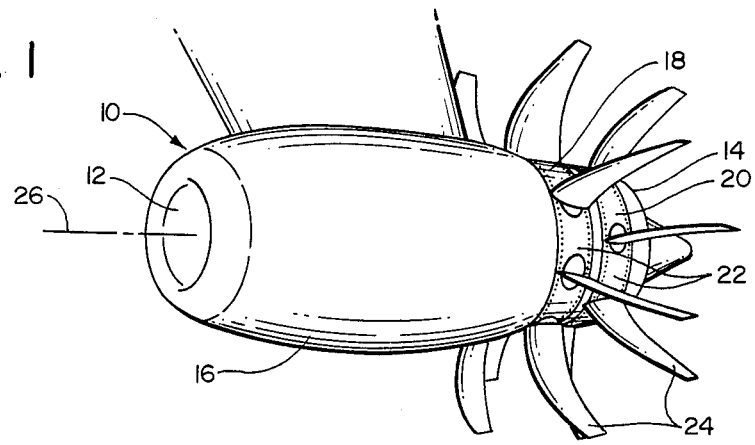
FIG. 1 is an isometric exterior view of an unducted turbofan engine.

While the present invention is susceptible of various modifications and alternative forms, specific embodiments thereof have been shown by way of example in the Drawings and will herein be described in detail. It should be understood, however, that it is not intended to limit the invention to the particular forms disclosed, but on the contrary, the intention is to cover all modifications, equivalents and alternatives falling the spirit and scope of the invention.

DETAILED DESCRIPTION

The present invention pertains to test apparatus for determining the total thrust output of a bladed unducted turbofan engine. However, before proceeding with a discussion of the test apparatus of the present invention, a discussion of the turbofan engine, as well as an older turboprop engine, will be provided in order to gain a better understanding of the test apparatus of the present invention.

Referring to FIG. 1, there is shown a turbofan engine indicated at 10 which is also known as an unducted fan engine (UDF TM) manufactured jointly by General Electric and NASA. The engine includes an inlet 12, an outlet 14, a gas generating section 16, and forward and rearward fan sections 18, 20, respectively, each fan section (i) has a cowling 22 which is removably mounted about its exterior, and (ii) radial blades 24 which extend outward through the cowlings 22. A majority of the engine thrust is generated by the bladed fan sections 18 and 20 which rotate about a lengthwise axis of the engine designated by the line 26. Furthermore, a minor portion of the thrust is generated by exhaust gases discharged from the outlet 14.

Figure 2:
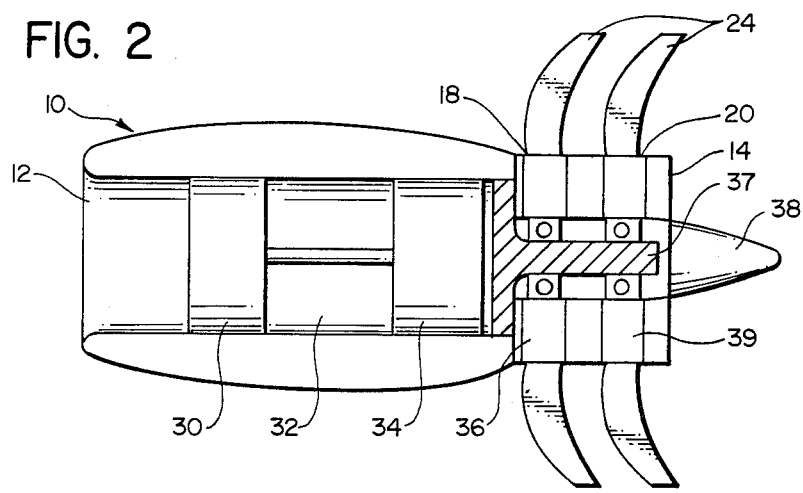
FIG. 2 is a very simplified interior view of the unducted turbofan engine.

Referring now to FIG. 2, there is shown a diagram, which is greatly simplified for ease of illustration, of the interior of the unducted turbofan engine. Air entering the inlet 12 is compressed by the compressor section 30, and then burned and expanded in the burner section 32 to drive a high power turbine section 34. The exhaust gases exiting the high pressure turbine section 34 are discharged into a first stage turbine 36 which rotates on a stationary shaft 37 attached to the rear frame 38 of the gas generating section 16. Turbine 36, in turn, causes the forward fan section 18 to rotate in a first direction. Furthermore, the gases discharged from the forward fan section are fed to a second stage turbine 39 of the rear fan section 20 similarly rotating about stationary shaft 37. These gases drive the rear fan section in a second direction which is opposite to the first direction of the forward fan section. The gases are then exhausted from the outlet 14. In this manner the forward blades are caused to rotate in a direction opposite the rear blades so as to provide a forward propelling force.

Figure 3:
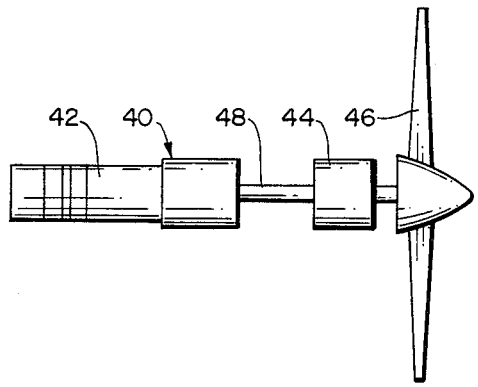
FIG. 3 is a side view of a conventional turboptop engine.

In order to compare the turbofan engine 10 with earlier model turboprop engines, reference is made to FIG. 3. In FIG. 3 there is shown a turboprop engine indicated at 40 having an engine section 42, a gearbox 44, a propeller 46, and a drive shaft 48 which connects the engine section to the gearbox. Conventionally, in order to determine the power output of the turboprop engine, a dynamometer was connected to the drive shaft 48 in order to measure the torque output therefrom. By measuring the shaft rpm and torque, the shaft horsepower (SHP) was calculated by the formula $$SHP = \frac{2\pi \left(\frac{N}{60}\right)T}{550}$$

where N equals the number of rotations per minute of the shaft, and T equals the measured torque in foot-pounds.

With regard to the turbofan engine 10 shown in FIGS. 1 and 2, however, there is no shaft conveniently available for measuring the torque of each blade section, as in the conventional turboprop engine. Furthermore, there is no means for simultaneously measuring the torque of each bladed section and the force generated by the exhausted gases in order to calculate the total thrust generated by engine.

Figure 4:
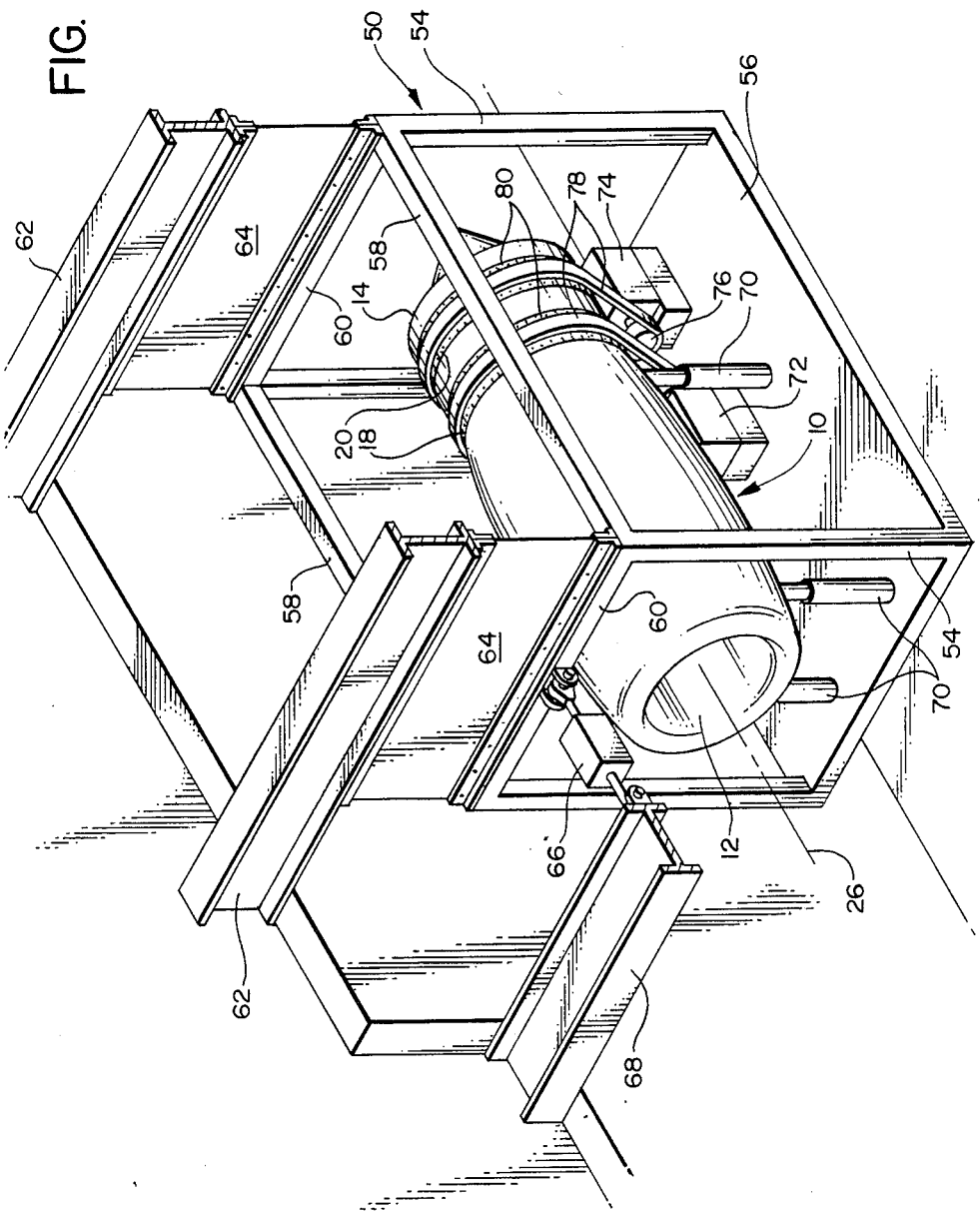
FIG. 4 is an isometric view of the test apparatus of the present invention.

Therefore, there is provided in the present invention a test cradle generally indicated at 50 in FIG. 4 for measuring (1) the torque generated by the bladed fan sections, and (2) the force generated by the exhaust gases. By measuring these variables along with several other variables including, but not limited to, blade RPM, inlet airflow and exhaust gas temperature, the total thrust generated by the engine at selected airspeeds can be calculated in a manner to be described later.

In the present invention the cradle includes a rectangular frame formed by four upstanding corner posts 54 which are connected at their lower ends to a floor 56 and at their upper ends to a pair of lengthwise horizontal bars 58 and front and rear transverse horizontal bars 60. Determination of the thrust generated by the exhaust gases is accomplished by suspending the cradle frame from a pair of beams 62 which are anchored to a supporting structure, such as a building, in a transverse direction above the cradle 50. This is accomplished by means of conventional flexures 64 which are connected at their upper ends to the beams 62, and at their lower ends to the front, rear bars 60 of the cradle. In this manner, there is very little resistance to fore and aft movement of the turbofan engine along the lengthwise axis 26. In order to measure the force generated by the exhaust gases, a conventional load cell 66, such as a Baldwin, Lima, Hamilton Model T3T28, is connected between a horizontal beam 68 of the building which extends in front of the cradle, and the frame's forward transverse bar 60.

In order to support the engine on the cradle 50, the engine is bolted to four adjustable supports 70 (FIG. 4) Which upstand from the cradle floor 56. Measurement of the rotational torque of the fan sections 18, 20 is accomplished by means of conventional dynamometers 72, 74, which are mounted to the cradle floor 56 below the engine. Each dynamometer includes a shaft 75 (FIG. 5) to which a pinion gear 76 is connected. The gear 76 is mounted in place of a conventional dynamometer coupler typically used for connecting the dynamometer shaft to a shaft under test. The torque of each fan section is measured by mounting individual, flexible, endless drive belts 78 (FIG. 6) around the fan sections so as to engage the dynamometer pinion gears 76 therebelow. The torque generated by the fan sections is measured by the dynamometer via the belts 78.

In order to connect the belts 78 to the fan sections, the fan blades 24 (FIG. 1), as well as the fan cowlings 22, are removed. The fan cowlings 22 are replaced by replacement cowlings 80 shown in FIG. 7. Each replacement cowling 80 is formed by a number of arcuate cowling sections 80' which extend circumferentially around the fan sections and which are attached to the fan sections in the same manner as the fan cowlings 22; that is, by removable fasteners. Each replacement cowling 80' includes a number of radially extending teeth 82 which engage complementary shaped slots 84 in the drive belts 78. Likewise, the dynamometer gears 76 are engaged within the slots 84 of the drive belts 78.

To complete the installation, after the replacement cowling sections 80' are installed on the fan sections 18, 20, the drive belts 78 are inserted over the cowlings 80 and the dynamometer gears 76. However, in order to facilitate attaching the drive belts 78 about the fan sections 18, 20 and associated dynamometer gears 76, the engine is lowered toward the cradle floor by means of the adjustable supports 70.

In a preferred embodiment, the adjustable supports 70 are formed by telescoping tubular sections which are raised and lowered hydraulically in a conventional manner at a central control station (not shown). Thus, after the drive belts 78 have been placed over the replacement cowlings 80 and the dynamometer gears 76, the engine is raised to the position shown in FIG. 5 to place the belts 78 in tension.

In order to calculate the total thrust generated by the engine, the engine is operated by means of conventional apparatus utilized to control and power a jet engine when detached from the aircraft and in a test stand environment. The torque of each fan section is measured by the dynamometers, and the rpm is measured by conventional tachometers (not shown). These measurements are then converted into horsepower (SHP) in the manner discussed previously herein.

The thrust $F_{blade}$ generated by the fan sections is calculated by the equation:

$$F_{blade} = N_{blade} \frac{(SHP_1 + SHP_2)}{V}$$

where $N_{blade}$ is the blade efficiency, V=aircraft flight velocity, and $SHP_1 + SHP_2$ = sum of the power calculated from torque measurements at dynamometers 72, 74.

The force, $F_{cell}$, generated by the exhaust gases is measured by the load cell 66. Exhaust total pressure ($P_T$), ambient pressure ($P_A$), and total temperature ($T_T$) are determined and engine inlet airflow and fuel flow are measured. Exhaust total pressure is measured by a conventional rake (not shown) attached at the outlet 14, and exhaust temperature ($T_T$) is measured by a conventional thermocouple (not shown) at the exhaust outlet. Engine inlet airflow is also measured in a conventional manner, whereas fuel flow is measured at a conventional fuel inlet supply line (not shown) to the engine. These data are used to determine the velocity coefficient ($C_v$) of the exhaust nozzle and are graphically displayed as a function of the pressure ratio, $P_T/P_A$ (FIG. 9). Nozzle thrust may then be calculated at any flight condition by the equation:

$$F_{nozzle} = (\omega_{air} + \omega_{fuel}) \frac{C_v}{g} - \frac{\omega_{air} V}{g} \quad \text{(Equation 1)}$$

where $\omega_{air}$ is the inlet airflow (lb/sec), $\omega_{fuel}$ is the fuel flow, V=flight velocity of the aircraft, g=gravity constant and $$C_v = F_{cell} / \frac{1}{g} (\omega_{air} + \omega_{fuel}) V_{Ji}$$

$$V_{Ji}(\text{ideal velocity}) = \sqrt{2gRT_T \left(\frac{\gamma}{\gamma - 1}\right) 1 - \frac{P_A}{P_T} \left(\frac{\gamma - 1}{\gamma}\right)}$$

where $\gamma$=coefficient of heat capacity ($C_p/C_v$) and R is the gas constant. By plotting $C_v$ as a function of the ratio $P_T/P_A$ as shown in FIG. 9, then $C_v$ may be obtained directly from measurements of $P_T$ and $P_A$ to facilitate calculation of $F_{nozzle}$ as shown in Equation 1.

The total thrust generated by the engine is the sum of the thrust generated by the exhaust gases and the bladed rotating fan sections, i.e., $$F_{TOTAL} = F_{blade} + F_{nozzle}$$

What is claimed is:

1. Apparatus for simultaneously measuring variables to calculate total thrust generated from a turbofan jet engine having a lengthwise axis and which is characterized by (1) a section for generating drive gases, (2) a fan section which rotates about the lengthwise axis in response to the drive gases and which includes (i) exterior blades which rotate with the fan section for generating a propelling force, and (ii) an outer cowling, and (3) an outlet section for exhausting the drive gases to the atmosphere to provide a further propelling force, the apparatus comprising:

a. a cradle for supporting the engine;
   b. means for suspending the cradle from a support structure so as to permit movement of the cradle in the lengthwise direction;
   c. means for measuring a forward force generated by the drive gases which are exhausted to the atmosphere for calculating the nozzle gas thrust, said measuring means including load cell means which are connected between said support structure and said cradle;
   d. dynamometer means including a rotatable portion, for measuring a torque generated by the engine fan section for calculating the thrust output of the fan section; and
   e. drive gear means for connecting said dynamometer means to the engine fan section, said drive gear means including belt means which are removably connected to the fan section and to the rotatable portion of said dynamometer means so as to transmit a rotational force between said fan section and said dynamometer means.

2. The apparatus as set forth in claim 1 wherein:
a. said drive gear means includes a first gear which is mounted about said fan section;
b. said rotatable portion of said dynamometer means includes a second gear; and
c. said belt means is engaged to said first gear and to said second gear to transmit said rotational force therebetween.

3. The apparatus as set forth in claim 2 wherein:
a. said exterior blades are removably connected to the fan section;
b. said outer cowling is removably attached to the fan section by removable fasteners;
c. said first gear includes at least one outer cover which is removably attached to said fan section by said fasteners in place of said outer cowling; and
d. said cover rotates with said fan section about said lengthwise axis.

4. The apparatus as set forth in claim 3 wherein:
a. said cover includes a number of teeth about the outer perimeter thereof;
b. said belt means includes an endless belt having a number of slots for receiving said cover teeth therein; and
c. said second gear includes a number of teeth which engage the slots of said endless belt.

5. The apparatus as set forth in claim 4 wherein said cradle means includes
(1) a lower portion including a floor upon which said dynamometer means are supported,
(2) an upper portion, and
(3) means for supporting the engine at selected elevations from the cradle floor so as to position the engine between a first, closer location to the dynamometer gear to permit insertion of the drive belt on the cover teeth and the dynamometer gear teeth, and a second position where the engine is at a greater distance from the dynamometer than the first position so as to tension the belt about the cover gear and the dynamometer gear.

6. The apparatus as set forth in claim 5 wherein said cradle suspending means includes a plurality of flexures which are connected to the upper portion of said cradle and to the support structure.

7. A method for measuring variables to calculate total thrust generated from a jet engine having a lengthwise axis and which is characterized by (i) a section for generating drive gases, (ii) a propeller section which rotates about the lengthwise axis in response to the drive gases, and (iii) an outlet section for exhausting the drive gases to the atmosphere to provide a further propelling force, the method comprising the steps of:
a. suspending the engine from a support structure so as to permit movement of the engine in the lengthwise direction;
b. measuring a forward force generated by the drive gases by load cell means which is connected between the support structure and the engine so as to calculate the thrust output of the exhaust gases; and
c. measuring a torque generated by the engine propeller section by dynamometer means so as to calculate the thrust output of the propeller section.

* * * * *